United States Patent [19]

Juds et al.

[11] Patent Number: 4,841,246

[45] Date of Patent: Jun. 20, 1989

[54] MULTITURN SHAFT POSITION SENSOR HAVING MAGNET MOVABLE WITH NONROTATING LINEAR MOVING NUT

[75] Inventors: Mark A. Juds, New Berlin; Bruce C. Beihoff, Glendale, both of Wis.

[73] Assignee: Eaton Corporation, Cleveland, Ohio

[21] Appl. No.: 139,218

[22] Filed: Dec. 29, 1987

[51] Int. Cl.⁴ .................................................. G01B 7/30
[52] U.S. Cl. ................................ 324/208; 340/870.33
[58] Field of Search ............... 324/207, 208; 318/653; 180/141, 142; 73/862.36, 862.69; 340/870.33, 686; 341/15

[56] References Cited

U.S. PATENT DOCUMENTS 3,973,191  8/1976  Zabler ........................... 324/207

FOREIGN PATENT DOCUMENTS

| 2415233 | 10/1975 | Fed. Rep. of Germany | 324/208 |
| 2302503 | 10/1976 | France | 324/208 |
| 0060157 | 5/1977 | Japan | 324/207 |
| 0497524 | 3/1976 | U.S.S.R. | 324/208 |
| 0696389 | 11/1979 | U.S.S.R. | 324/208 |

Primary Examiner—Gerard R. Strecker
Attorney, Agent, or Firm—Krass & Young

[57] ABSTRACT

The present invention is a shaft position sensor for detection of the position of a multiturn shaft. The rotation of the multiturn shaft is converted into a linear motion via a multiturn screw and a nonrotating nut. A magnet is mounted on the nonrotating nut. The linear movement of the magnet is converted into an electrical signal using one or more magneto resistive structures. A pair of flux plates is disposed on either side of the linear path of the magnet with at least one narrow gap opposite one end of the linear path of the magnet. A single magneto resistive structure is disposed in each such narrow gap. An electrical circuit measures the resistance of the one or more magneto resistive structures, this resistance varying with magnetic flux, and generates an electrical position signal which indicates the rotary position of the multiturn shaft. Linearity in response can be provided by a flux shunt which blocks magnetic flux directly from the magnet, control of the distance of the flux plates from the linear path of the magnet, or varying the magnetic permeability of the flux plates with position along the linear path, for example, by varying the thickness of the flux plates.

15 Claims, 2 Drawing Sheets

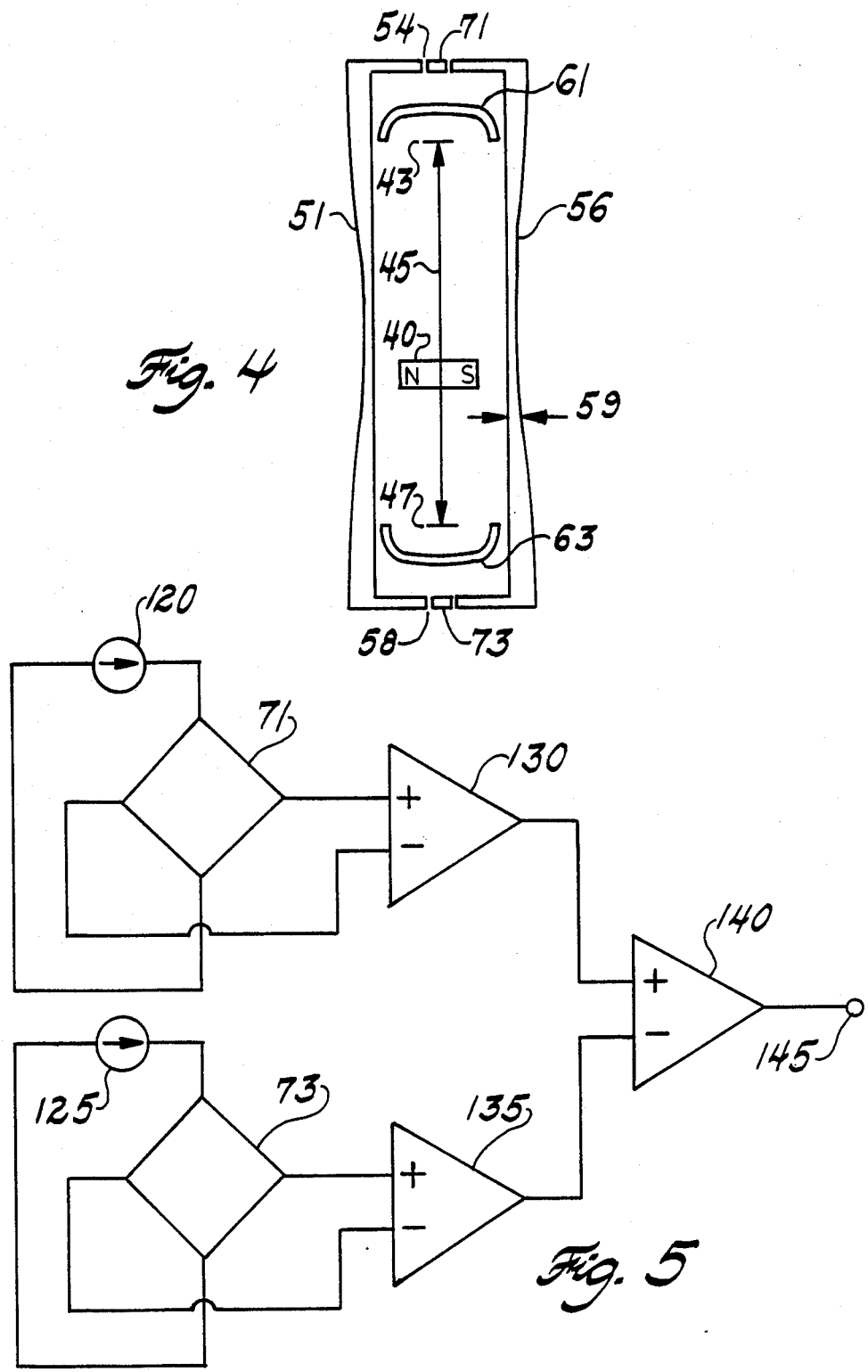

MULTITURN SHAFT POSITION SENSOR HAVING MAGNET MOVABLE WITH NONROTATING LINEAR MOVING NUT

TECHNICAL FIELD OF THE INVENTION

The technical field of the present invention is that of shaft position sensors and particularly of the detection of the position of a multiturn shaft device such as a steering wheel in a vehicle.

BACKGROUND OF THE INVENTION

The present invention is directed to the field of shaft position sensors. There is a particular problem with shaft position sensors which are to operate on multiturn shafts. It is technically feasible to provide an unambiguous signal from a shaft encoding device to detect the position of a single turn of the shaft. However, such is not the case with a shaft that can operate through a multiple of turns.

Often it is desired to provide such an output with regard to a multiturn shaft. Such is the case with detecting the position of the steering wheel of a motor vehicle. Typically a steering wheel can be operated for multiple turns from full left turn to full right turn. Merely detecting the position of the shaft with an ambiguity of a full turn would not unambiguously detect the position of the controlled wheels. Thus such a system without more would be inadequate to provide an indication of the turning of the vehicle.

This problem can be solved with auxiliary equipment as a part of the sensor device. A mechanical reduction gear could be employed to reduce the multiturn movement into movement of less than a single turn of a secondary shaft. A shaft encoder on this secondary shaft could thus resolve the ambiguity. Alternately, a shaft encoder on the primary shaft could be connected to an electronic system to keep count of the turns both clockwise and counter clockwise to provide resolution of the ambiguity. Because of drawbacks is these systems, such as mechanical backlash in the case of a mechanical reduction system and the necessity for additional complex circuits for electronic systems, there is a need in the art for a simple system to unambiguously detect the position of a multiturn shaft.

SUMMARY OF THE INVENTION

The present invention is a shaft position sensor for detection of the position of a multiturn shaft. Such multiturn shafts are employed, for example, in the steering wheel in a vehicle. This invention operates in two steps.

Firstly, the rotation of the multiturn shaft is converted into a linear motion. This is accomplished using a multiturn screw and a nonrotating nut. The nonrotating nut is mounted on the multiturn screw which rotates in the same fashion as the shaft whose position is to be detected. The multiturn screw causes linear motion of the nonrotating nut.

Secondly, this linear motion is converted into an electrical shaft position signal. In accordance with the preferred embodiment of the present invention, this takes place as a result of varying magnetic flux. A magnet, which is preferably a permanent magnet, is mounted on the nonrotating nut and moves with the linear movement of the nonrotating nut. The linear movement of the magnet is converted into an electrical signal using one or more magneto resistive structures.

In a first embodiment a single magneto resistive structure is employed. A pair of flux plates is disposed on either side of the linear path of the magnet. These flux plates are formed with a narrow gap opposite one end of the linear path of the magnet. The single magneto resistive structure is disposed in this narrow gap. The magnetic flux from the magnet, as detected by the magneto resistive structure in the narrow gap between the flux plates, varies with the position of the magnet along the linear path. An electrical circuit measures the resistance of the magneto resistive structure, this resistance varying with magnetic flux, and generates an electrical position signal which indicates the rotary position of the multiturn shaft.

In a second embodiment a pair of magneto resistive structures are employed. The pair of flux plates are formed with two narrow gaps, one at each end of the linear path of the magnet. The magneto resistive structures are disposed in respective narrow gaps. The magnetic flux from the magnet, as detected by each of the magneto resistive structures, varies with the position of the magnet along the linear path. The electrical circuit measures the difference in resistance between the two magneto resistive structures. This difference in resistance varies with the position of the magnet. The electrical circuit generates the position signal corresponding to this difference in resistance.

Linearity in response can be provided by several techniques. A flux shunt is disposed between the position of a magneto resistive structure and the path of the magnet. This ensures that the magnetic flux through the magneto resistive structure is primarily due to the flux through the pair of flux plates and not due to the near field of the magnet. The distance of the flux plates from the linear path of the magnet is controlled to provide linear resistance response at the magneto resistive structure or structures. This provides greater or lesser magnetic flux from the magnet within the flux plates as the distance is greater or less. A third manner to provide linearity in response is to vary the magnetic permeability of the flux plates with position along the linear path. This variation in magnetic permeability can most easily be achieved by varying the thickness of the flux plates.

BRIEF DESCRIPTION OF THE DRAWINGS

The above aspects and objects of the present invention can be understood from the following detailed description of the invention taken in conjunction with the drawings in which:

FIG. 4 illustrates the magnetic components of a second embodiment of the present invention employing a pair of magneto resistive structures; and FIG. 5 illustrates the electrical circuit of the second embodiment of the present invention.

DETAILED DESCRIPTION OF THE PREFERRED EMBODIMENTS

Figures 1, 2:
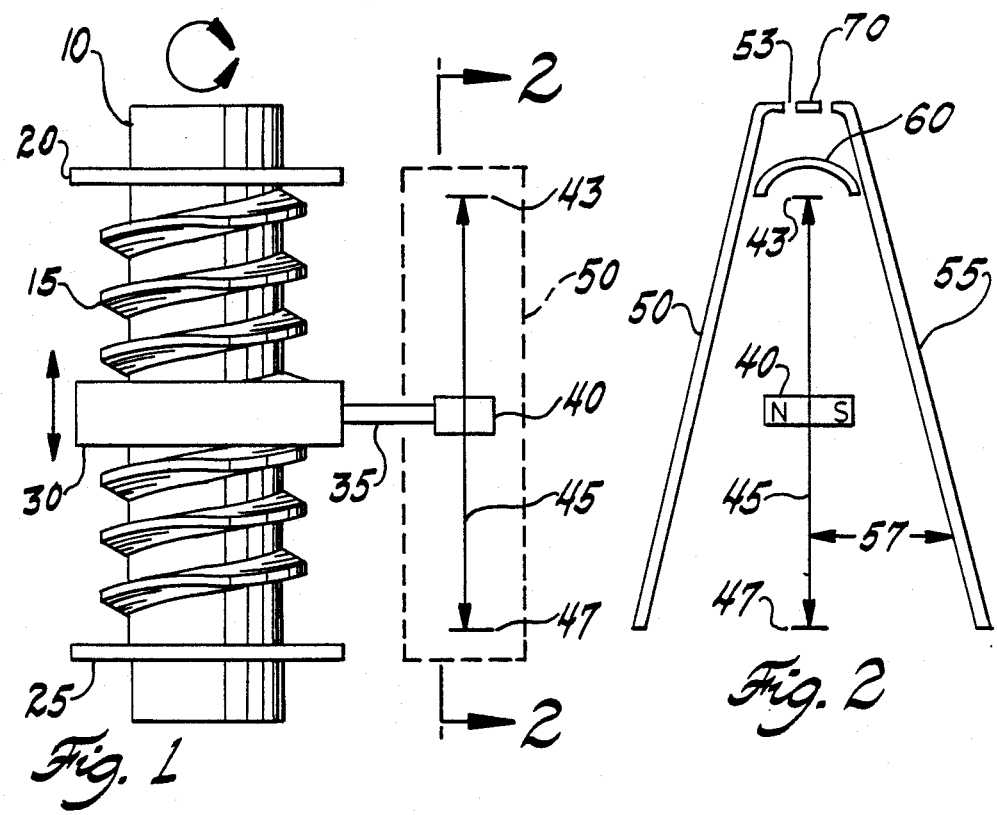
FIG. 1 illustrates the manner of converting the multiturn shaft motion into linear motion.
FIG. 2 illustrates the magnetic components of a first embodiment of the present invention employing a single magneto resistive structure.

FIG. 1 illustrates the mechanical portion of the present invention which converts the multiturn motion of the shaft into linear motion. Multiturn shaft 10 is mechanically coupled to the shaft whose position is to be detected. This connection is in a manner to insure correspondence between the rotary motion of the shaft whose position is to be detected and multiturn shaft 10. It is feasible that multiturn shaft 10 could be formed as a part of the shaft whose position is to be detected. Alternately, multiturn shaft 10 could be coupled to such a shaft via a gear or belt system.

Multiturn shaft 10 includes a thread 15. Mounted on multiturn shaft 10 at respective ends of thread 15 are end stops 20 and 25. End stops 20 and 25 prevent nonrotating nut 30 from running off the ends of thread 15. In the preferred embodiment end stops 20 and 25 correspond to the permitted range of motion of the shaft whose position is to be detected. Magnet 40 is coupled to nonrotating nut 30 via a shaft 35. Magnet 40 is preferably a permanent magnet.

It can be seen from FIG. 1 that rotary motion is converted into linear motion. As multiturn shaft 10 rotates, thread 15 causes nonrotating nut 30 to travel linearly between end stops 20 and 25. This in turn causes magnet 40 to move along linear path 45 between first end 43 and second end 47. The linear motion of magnet 40 is employed to generate an electrical position signal in a manner detailed below.

FIG. 2 illustrates the magnetic components in accordance with a first embodiment of the present invention. Disposed on either side of the path 45 of magnet 40 are a pair of flux plates 50 and 55. These flux plates 50 and 55 surround the path 45 of magnet 40 from first end 43 to second end 47. The multiturn shaft 10, thread 15, end stops 20 and 25, and nonrotating nut 30 are not illustrated in FIG. 2 for the sake of clarity, however, as illustrated in FIG. 1 these parts appear below the flux plates 50 and 55 from the point of view illustrated in FIG. 2. Flux plates 50 and 55 are disposed to create a narrow gap 53 therebetween beyond first end 43. Magneto resistive structure 70 is disposed in this narrow gap 53. A flux shunt 60 is disposed beyond first end 43 of path 45 between magneto resistive structure 70 and magnet 40.

The position of multiturn shaft 10 is detected by detecting magnetic flux within narrow gap 53. Flux plates 50 and 55, and flux shunt 60 are formed of a material high in magnetic permeability, such as steel. Thus flux plates 50 and 55, and flux shunt 60 tend to cause the lines of the magnetic field from magnet 40 to follow these structures. As illustrated in FIG. 2 the distance 57 between path 45 and flux plate 55 varies with the position along path 45. The distance of flux plate 50 from path 45 varies similarly. As a consequence, a greater number of magnetic flux lines from magnet 40 touch flux plates 50 and 55 when magnet 40 is nearer first end 43 of path 45. Because flux plates 50 and 55 are formed of a material high in magnetic permeability, substantially all of these flux lines touching flux plates 50 and 55 follow these flux plates and consequently appear across narrow gap 53. Magneto resistive structure 70 is disposed in narrow gap 53 to detect the magnitude of magnetic flux. Magneto resistive structure 70 exhibits differing electrical resistance in the presence of differing magnetic flux intensity. Thus the resistance of magneto resistive structure 70 is a measure of the position of magnet 40 along path 45 and hence of the position of multiturn shaft 10.

Flux shunt 60 is provided to increase the linearity of response between the resistance of magneto resistive structure 70 and the position of magnet 40. Flux shunt 60 serves to block the near field magnetism from magnet 40 from reaching magneto resistive structure 70 directly, that s without following flux plates 50 and 55. In the absence of flux shunt 60, magnetic flux from magnet 40 would reach magneto resistive structure 70 directly from magnet 40, especially when magnet 40 is near first end 43. This direct incidence of magnetic flux would result in a nonlinear response of the resistance of magneto resistive structure 70 to the position of magnet 40.

Further linearity adjustment can be made via the distance 57 between path 45 and the flux plates 50 and 55. The shape of the flair in flux plates 50 and 55 determines the relationship between the position of magnet 40 along path 45 and the flux appearing across narrow gap 53. It is feasible to provide a nonlinear flair in flux plates 50 and 55 to compensate for nonlinearity in the response of magneto resistive structure 70 to magnetic flux.

Figure 3:
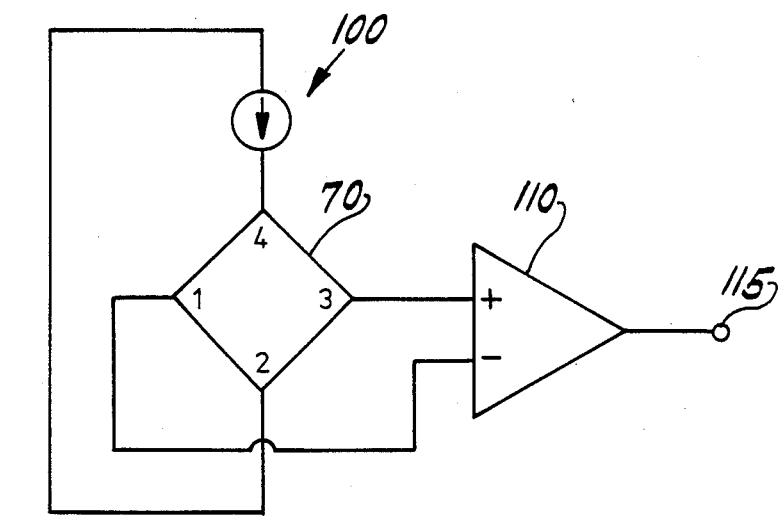
FIG. 3 illustrates the electrical circuit of the first embodiment of the present invention.

FIG. 3 illustrates in schematic form the electrical circuit for detecting the resistance of magneto resistive structure 70. In accordance with the present invention the magneto resistive structure is constructed as a Wheatstone bridge. This enables greater sensitivity to any changes in the resistance caused by changing magnetic fields. In accordance with the present invention a constant current source 100 is employed to drive opposite arms 2 and 4 of the Wheatstone bridge of the magneto resistive structure 70. The voltage difference appearing across the other pair of arms 1 and 3 is measured. The voltage at arm 1 is applied to the inverting input of operational amplifier 110 and the voltage at arm 3 is applied to the noninverting input of operational amplifier 110. Operational amplifier 110 thus provides a measure of the differential resistance within magneto resistive structure 70 at output terminal 115.

FIG. 4 illustrates the magnetic components in accordance with a second embodiment of the present invention which employs two magneto resistive structures. Disposed on either side of the path 45 of magnet 40 are a pair of flux plates 51 and 56. Theses flux plates 51 and 56 are similar to flux plates 50 and 55 illustrated in FIG. 2. Flux plates 51 and 56 are disposed to substantially surround path 45 of magnet 40. Flux plates 51 and 56 create a first narrow gap 54 therebetween beyond first end 43 and a second narrow gap 58 therebetween beyond second end 47. A first magneto resistive structure 71 is disposed in the first narrow gap 54 and a second magneto resistive structure 73 is disposed in the second narrow gap 58. A first flux shunt 61 is disposed beyond first end 43 of path 45 between first magneto resistive structure 71 and magnet 40. Likewise a second flux shunt 63 is disposed beyond second end 47 between second magneto resistive structure 73 and magnet 40.

The position of multiturn shaft 10 is detected by detecting magnetic flux within narrow gaps 54 and 58. Flux plates 51 and 56, and flux shunts 61 and 63 are formed of a material high in magnetic permeability, such as steel. Because the flux plates 51 and 56 substantially surround magnet 40 the magnet flux from magnet 40 appears across either first narrow gap 54 or second narrow gap 58. The sum of the magnetic flux at first narrow gap 54 and second narrow gap 58 is substantially constant. However, the difference in the magnetic flux between the magnetic flux at first narrow gap 54 and the magnetic flux at second narrow gap 58 is indicative of the position along path 45 of magnet 40. Thus the difference in electrical resistance between the resistance of first magneto resistive structure 71 and the resistance of second magneto resistive structure 73 is a measure of the position of magnet 40 along path 45 and hence of the position of multiturn shaft 10.

Linearity of response can be controlled in the same manner as previously described in relation to FIG. 2. In particular, first flux shunt 61 and second flux shunt 63 are provided to shield first magneto resistive structure 71 and second magneto resistive structure 73, respectively, from magnetic flux directly from magnet 40. FIG. 4 also illustrates a variable thickness 59 of flux plate 56 which can provide additional linearity control. Varying the thickness 59 of flux plates 51 and 56 is a manner of controlling the magnetic permeability of these flux shunts as a function of the position along path 45. Such control of magnetic permeability provides an additional manner to adjust the linearity of the response of the sensor.

FIG. 5 illustrates schematically the electrical circuit for detecting the difference in electrical resistance between first magneto resistive structure 71 and second magneto resistive structure 73, and hence for detecting the position of multiturn shaft 10. Constant current source 120 drives first magneto resistive structure 71, which is in turn connected to operational amplifier 130. Likewise, constant current source 125 drives second magneto resistive structure 73 which is coupled to operational amplifier 135. These magneto resistive structures are connected in the same manner as illustrated in FIG. 3. The output of operational amplifier 130, representing the resistance of magneto resistive structure 71, is connected to the noninverting input of operation amplifier 104. The output of operational amplifier 135, representing the resistance of magneto resistive structure 73, is connected to the noninverting input of operational amplifier 140. Operational amplifier 140 forms the difference of theses two signals. As magnet 40 is driven to approach one or the other magneto resistive structure 71 or 73, the signal of that structure increases while the signal of the other magneto resistive structure which magnet 40 is moving away from decreases proportionately. Thus the output of operational amplifier 145 appearing at output terminal 145 represents the position of magnet 40 along path 45 and hence the position of multiturn shaft 10.

We claim:

1. A multiturn shaft position sensor for detecting the position of a multiturn shaft comprising:
    a multiturn screw disposed to turn with the multiturn shaft;
    a nonrotating nut mounted on said multiturn screw for linear movement dependent upon the turning of said multiturn screw;
    a magnet disposed upon said nonrotating nut for linear movement along a predetermined movement path from a first end to a second end with said linear movement of said nonrotating nut;
    a pair of flux plates formed of a material of high magnetic permeability disposed on opposite sides of said movement path of said magnet having a narrow gap therebetween proximate to said first end of said movement path;
    a magneto resistive structure disposed in said narrow gap between said pair of flux plates having an electrical resistance dependent upon the magnetic flux therethrough; and
    an electrical circuit connected to said magneto resistive structure for measuring said electrical resistance of said magneto resistive structure and generating a position signal indicative of the position of the multiturn shaft proportional to said electrical resistance of said magneto resistive structure.

2. The multiturn shaft position sensor as claimed in claim 1, wherein the multiturn shaft is connected to a vehicle steering wheel and said position signal indicates the position of the steering wheel.

3. The multiturn shaft position sensor as claimed in claim 1, wherein said magnet is a permanent magnet.

4. The multiturn shaft position sensor as claimed in claim 1, further comprising:
    a flux shunt formed of a material high in magnetic permeability disposed between said pair flux plates proximate to said first end of said movement path for shielding said magneto resistive structure from direct magnetic fields from said magnet, whereby the magnetic flux through said magneto resistive structure is primarily from said pair of flux plates.

5. The multiturn shaft position sensor as claimed in claim 1, wherein:
    said pair of flux plates have a distance therebetween which increases for portions of said pair of flux plates which are further from said first end of said movement path, whereby the magnetic flux from said magnet within said narrow gap is greatest when said magnet is near said first end of said movement path and decreases for portions of said movement path further from said first end of said movement path.

6. The multiturn shaft position sensor as claimed in claim 5, wherein:
    said distance between said pair of flux plates varies with the distance from said first end of said movement path whereby said electrical resistance of said magneto resistive structure changes linearly with the distance of said magnet from said first end of said movement path.

7. The multiturn shaft position sensor as claimed in claim 1, wherein:
    the magnetic permeability of said pair of flux plates is varied with the distance from said first end of said movement path whereby the electrical resistance of said magneto resistive structure changes linearly with the distance of said magnet from said first end of said movement path.

8. The multiturn shaft position sensor as claimed in claim 7, wherein:
    said magnetic permeability of said pair of flux plates is varied by varying the thickness of said flux plates with the distance from said first end of said movement path.

9. A multiturn shaft position sensor for detecting the position of a multiturn shaft comprising:
    a multiturn screw disposed to turn with the multiturn shaft;
    a nonrotating nut mounted on said multiturn screw for linear movement dependent upon the turning of said multiturn screw;
    a magnet disposed upon said nonrotating nut for linear movement along a predetermined movement path from a first end to a second end with said linear movement of said nonrotating nut;
    a pair of flux plates formed of a material of high magnetic permeability disposed on opposite sides of said movement path of said magnet having a first narrow gap therebetween proximate to said first end of said movement path and a second narrow gap therebetween proximate to said second end of said movement path;

a first magneto resistive structure disposed in said first narrow gap between said pair of flux plates having an electrical resistance dependent upon the magnetic flux therethrough;

a second magneto resistive structure disposed in said second narrow gap between said pair of flux plates having an electrical resistance dependent upon the magnetic flux therethrough; and an electrical circuit connected to said first and second magneto resistive structures for measuring said electrical resistance of said first and second magneto resistive structures and generating a position signal indicative of the position of the multiturn shaft proportional to the difference between said electrical resistance of said first magneto resistive structure said electrical resistance of said second magneto resistive structure.

10. The multiturn shaft position sensor as claimed in claim 9, wherein the multiturn shaft is connected to a vehicle steering wheel and said position signal indicates the position of the steering wheel.

11. The multiturn shaft position sensor as claimed in claim 9, wherein said magnet is a permanent magnet.

12. The multiturn shaft position sensor as claimed in claim 9, further comprising:

a first flux shunt formed of a material high in magnetic permeability disposed between said pair flux plates proximate to said first end of said movement path for shielding said first magneto resistive structure from direct magnetic fields from said magnet, whereby the magnetic flux through said first magneto resistive structure is primarily from said pair of flux plates;

a second flux shunt formed of a material high in magnetic permeability disposed between said pair flux plates proximate to said second end of said movement path for shielding said second magneto resistive structure from direct magnetic fields from said magnet, whereby the magnetic flux through said second magneto resistive structure is primarily from said pair of flux plates.

13. The multiturn shaft position sensor as claimed in claim 9, wherein:

said distance between said pair of flux plates varies with the distance from said first end of said movement path whereby said difference between said electrical resistance of said first magneto resistive structure said electrical resistance of said second magneto resistive structure changes linearly with the distance of said magnet from said first end of said movement path.

14. The multiturn shaft position sensor as claimed in claim 9, wherein:

the magnetic permeability of said pair of flux plates is varied with the distance from said first end of said movement path whereby said difference between said electrical resistance of said first magneto resistive structure and said electrical resistance of said second magneto resistive structure changes linearly with the distance of said magnet from said first end of said movement path.

15. The multiturn shaft position sensor as claimed in claim 14, wherein:

said magnetic permeability of said pair of flux plates is varied by varying the thickness of said flux plates with the distance from said first end of said movement path.

* * * * *